Feb. 22, 1966 M. E. ALBERDA 3,237,175

MAGNETIC TRANSDUCER AND MEMORY DRUM ASSEMBLY

Filed Dec. 17, 1959 10 Sheets-Sheet 1

INVENTOR
MARVIN E. ALBERDA
BY G. W. Lessons
ATTORNEY

Feb. 22, 1966 M. E. ALBERDA 3,237,175

MAGNETIC TRANSDUCER AND MEMORY DRUM ASSEMBLY

Filed Dec. 17, 1959 10 Sheets-Sheet 2

MAGNETIC TRANSDUCER AND MEMORY DRUM ASSEMBLY

Filed Dec. 17, 1959

Feb. 22, 1966 M. E. ALBERDA 3,237,175

MAGNETIC TRANSDUCER AND MEMORY DRUM ASSEMBLY

Filed Dec. 17, 1959 10 Sheets-Sheet 4

Feb. 22, 1966 M. E. ALBERDA 3,237,175

MAGNETIC TRANSDUCER AND MEMORY DRUM ASSEMBLY

Filed Dec. 17, 1959 10 Sheets-Sheet 5

Feb. 22, 1966 M. E. ALBERDA 3,237,175

MAGNETIC TRANSDUCER AND MEMORY DRUM ASSEMBLY

Filed Dec. 17, 1959 10 Sheets-Sheet 8

Feb. 22, 1966 M. E. ALBERDA 3,237,175

MAGNETIC TRANSDUCER AND MEMORY DRUM ASSEMBLY

Filed Dec. 17, 1959 10 Sheets-Sheet 9

Feb. 22, 1966 M. E. ALBERDA 3,237,175

MAGNETIC TRANSDUCER AND MEMORY DRUM ASSEMBLY

Filed Dec. 17, 1959 10 Sheets-Sheet 10

United States Patent Office 3,237,175
Patented Feb. 22, 1966

3,237,175
MAGNETIC TRANSDUCER AND MEMORY DRUM ASSEMBLY

Marvin E. Alberda, Sun Valley, Calif., assignor to General Precision, Inc., a corporation of Delaware
Filed Dec. 17, 1959, Ser. No. 860,282
3 Claims. (Cl. 340—174.1)

The present invention relates to an improved digital computer which is light in weight and compact in size so as to render the apparatus ideal for the many purposes in which such features are important. The computer of the invention has general purpose utility, therefore, wherever size, weight and economy are factors to be considered.

As noted above, a major feature of the computer of the invention is that it is light in weight and small in size. In order to achieve these features, the magnetic memory storage of the computer is constructed in an improved and unique manner so as to require a minimum of space.

In addition, the computer of the invention utilizes especially constructed miniature electro-magnetic read and write heads. These heads are constructed in such a manner that they are extremely small in size and can be mounted closely adjacent one another without any mutual interaction. A large number of read and write heads such as those mentioned above, are mounted on a shroud which surrounds a magnetic storage drum. The small size of these heads and their superior shielding characteristics are important factors in enabling the reduction in the over-all size and weight of the shroud and drum to a minimum.

The logic circuitry and components utilized in the computer of the invention are preferably mounted on individual boards or panels. These boards are supported, together with the magnetic memory storage unit, on an appropriate chassis. The boards are supported on the chassis in an upright position essentially parallel to one another so as to present a stack-like configuration. This mounting arrangement, as will be more fully described subsequently, also is an important factor in reducing the over-all size of the computer to a minimum.

Figure 1:
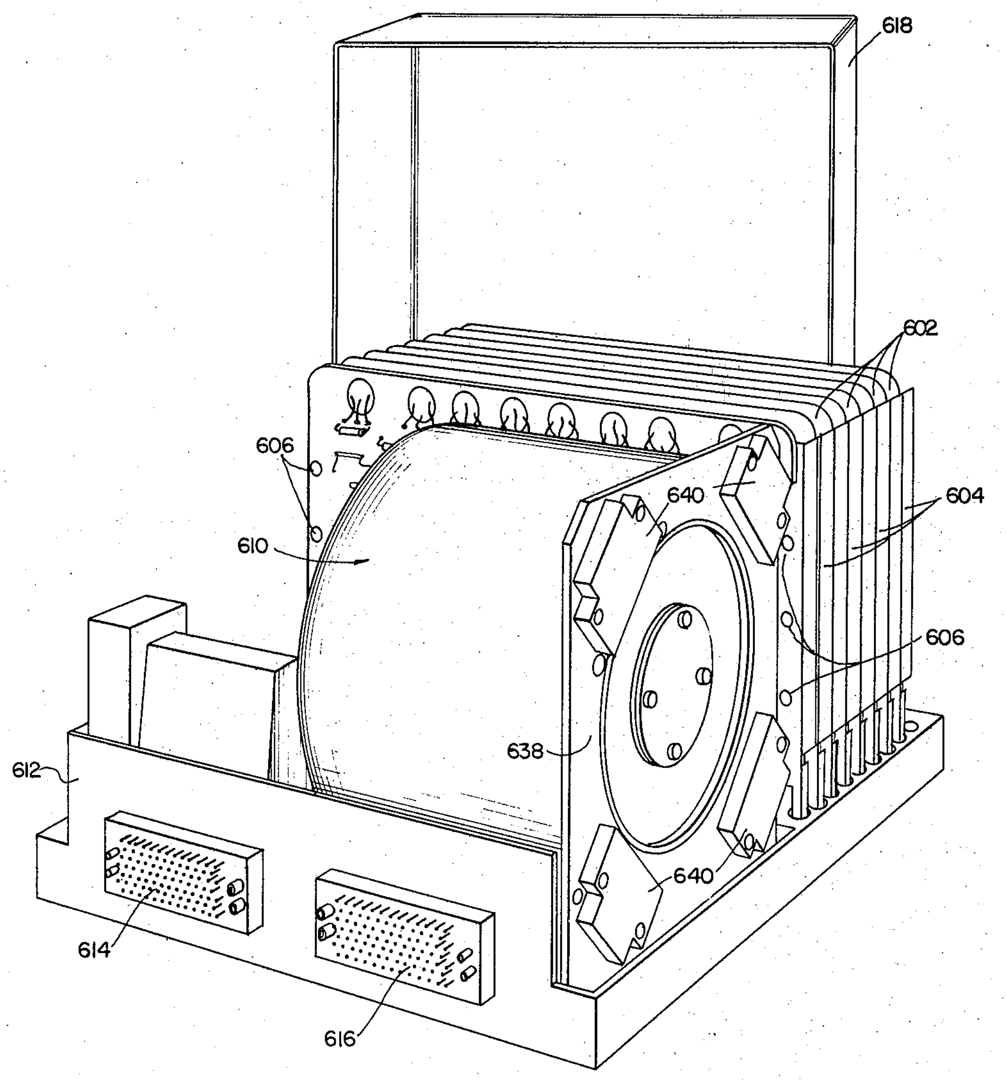
FIGURE 1 is a side perspective view of a constructed embodiment of the invention, this view illustrating the compact manner in which the memory and logic units of the illustrated computer are supported on a chassis.
Figure 2:
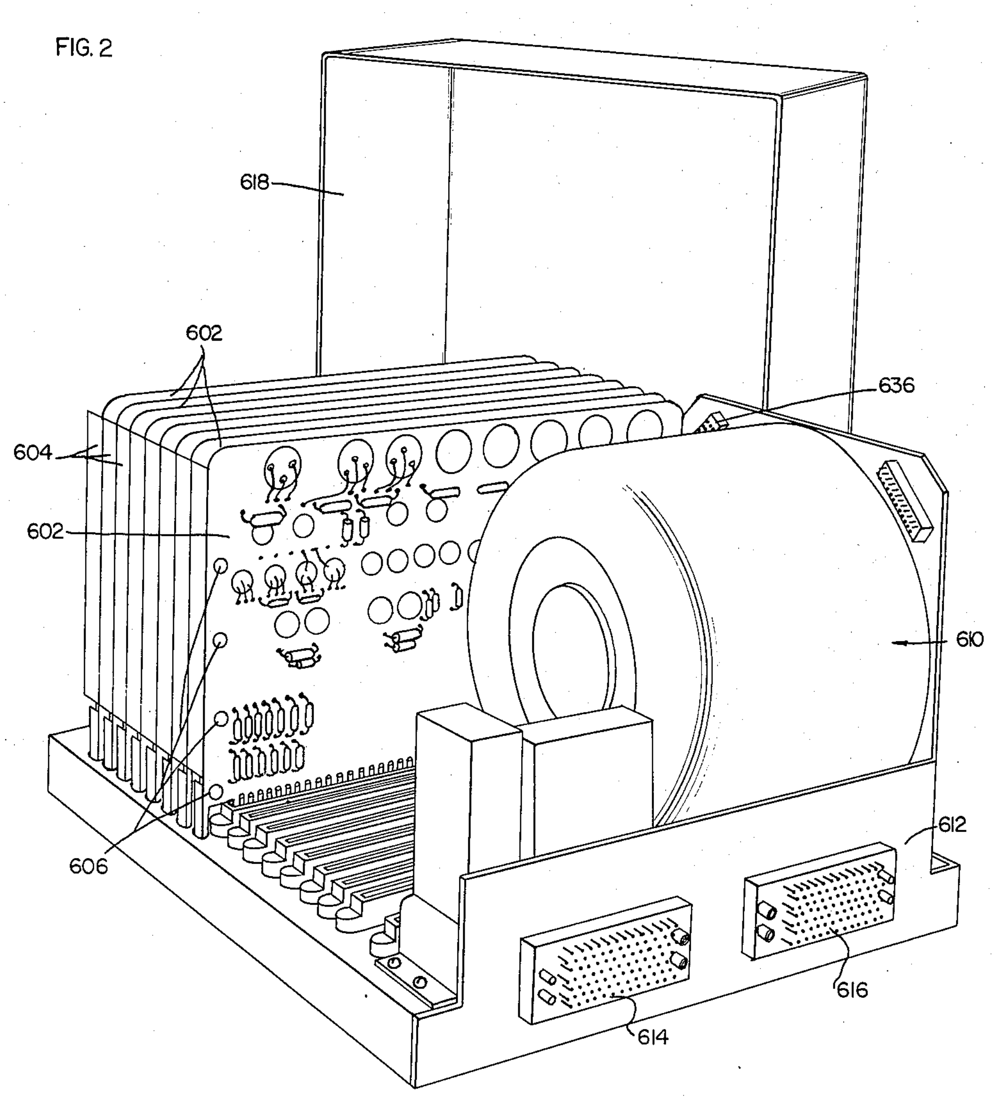
FIGURE 2 is another side perspective view of the constructed embodiment of the invention, the latter view also showing appropriate connectors and supporting brackets for the components of the computer.

As illustrated in FIGURES 1 and 2, the embodiment of the invention to be described includes a chassis 600. A plurality of panels or cards 602 are supported on the chassis 600 in an upright position, with the cards being spaced and parallel to one another. The cards are so supported by means of a plurality of brackets 604, the cards being secured to individual ones of the brackets by means of screws, such as the screws 606. The brackets 604 are removably supported on the chassis 600 by means of appropriate resilient plug and socket connections. Likewise, each of the panels or cards 602 has a plurality of terminals disposed along its lower edge, and these terminals extend into mating contacts in corresponding receptacle blocks supported by the chassis.

Each of the cards 602 supports logic circuitry and components, such as diodes, transistors, and the like. The arrangement described above, permits any card and its associated logic circuitry and components, to be removed from the chassis, and it permits appropriate connections between the logic circuitry on the particular card and the remainder of the computer to be established when the card is plugged into the chassis.

The chassis also supports a memory unit 610. As will be described in more detail subsequently, the memory 610 includes a rotatable magnetic memory drum. This type of memory is preferred at the present time because of its proven reliability. Moreover, the drum type of memory provides an economical storage for a large quantity of information, and it allows such a large quantity of information to be stored in a relatively small space. In addition, the information stored on the memory drum is not lost due to power or component failures, this being so because the storage is not volatile. Moreover, considerable simplification and consequent saving of electronic equipment is realized by using channels on the memory drum for recirculation registers, as will be described in more detail subsequently.

The chassis 600 also supports a side panel member 612, and this panel member has a pair of terminal blocks 614 and 616 supported on it. These terminal blocks provide a convenient means for connecting external components electrically to the circuitry of the computer. A cover 618 is provided, and this cover is secured to the chassis 600 by any appropriate attaching means.

A constructed embodiment of the invention, as illustrated in FIGURES 1 and 2, exhibited an over-all weight of twenty pounds, a size of .5 cubic feet, and it consumed approximately 50 watts of power.

Figure 3:
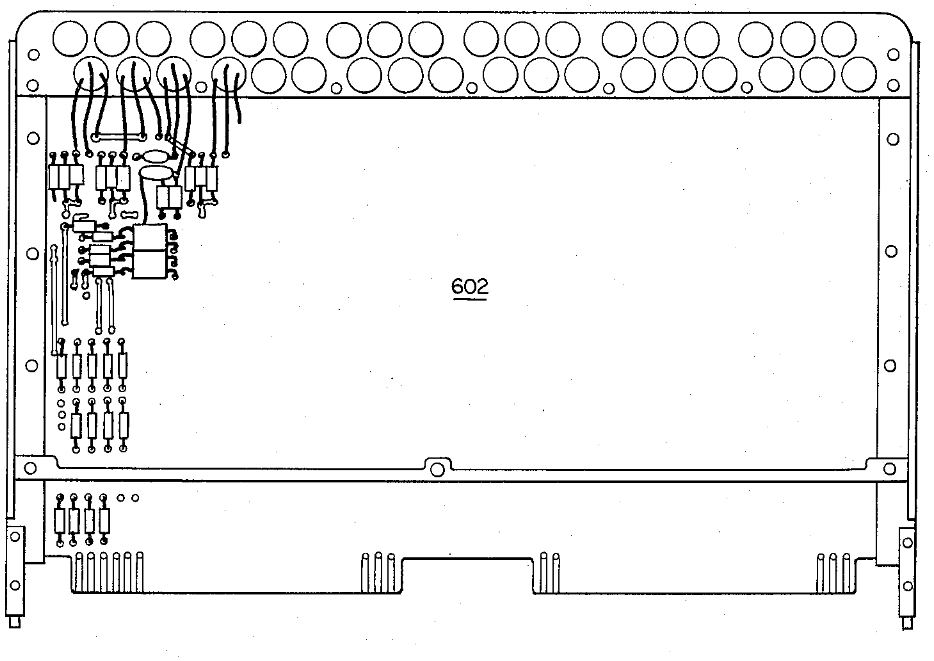
FIGURE 3 is a bottom view of a typical logic board which is included in the computer to be described, together with a plurality of similar boards, this view showing the manner in which the logic circuitry and components are supported on the board.

A typical one of the cards 602 is illustrated in the view of FIGURE 3. This view clearly illustrates the manner in which the various components required for the logic circuitry are supported on the cards, and the manner in which connections are made to the components. The logic circuitry required by the computer and mounted on the several cards will be described in detail subsequently.

Figure 4:
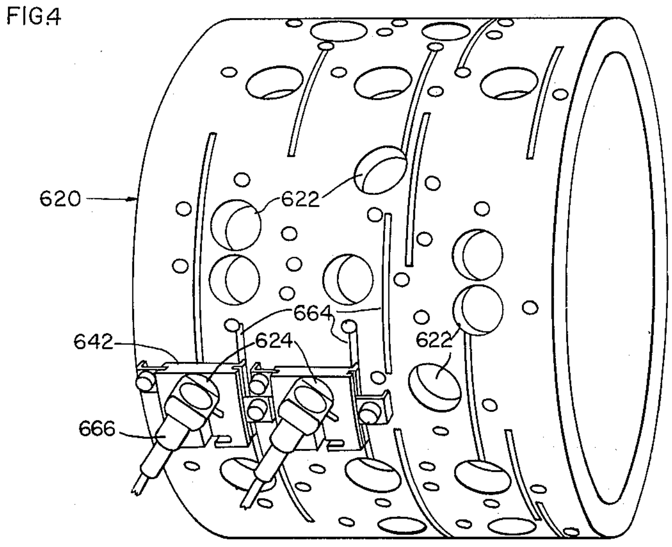
FIGURE 4 is a side perspective view of a magnetic drum memory which is included in the embodiment of the invention to be described, this view particularly showing a cylindrical shroud which encloses the memory drum and in which the different read and write heads associated with the memory drum are mounted.

The memory unit 610 includes a cylindrical-shaped stationary shroud 620 which is illustrated in FIGURE 4. The shroud 620 includes a plurality of apertures 622 which are disposed on its outer periphery and which extend through it. Each of these apertures is intended to receive an electro-magnetic transducer means, such as a write head or a read head. A magnetic drum is rotatably supported in a manner to be described, and the drum is positioned within the shroud 620 so that different axially-spaced annular tracks on the drum may be presented to the transducer heads supported in the apertures 622.

Figure 5:
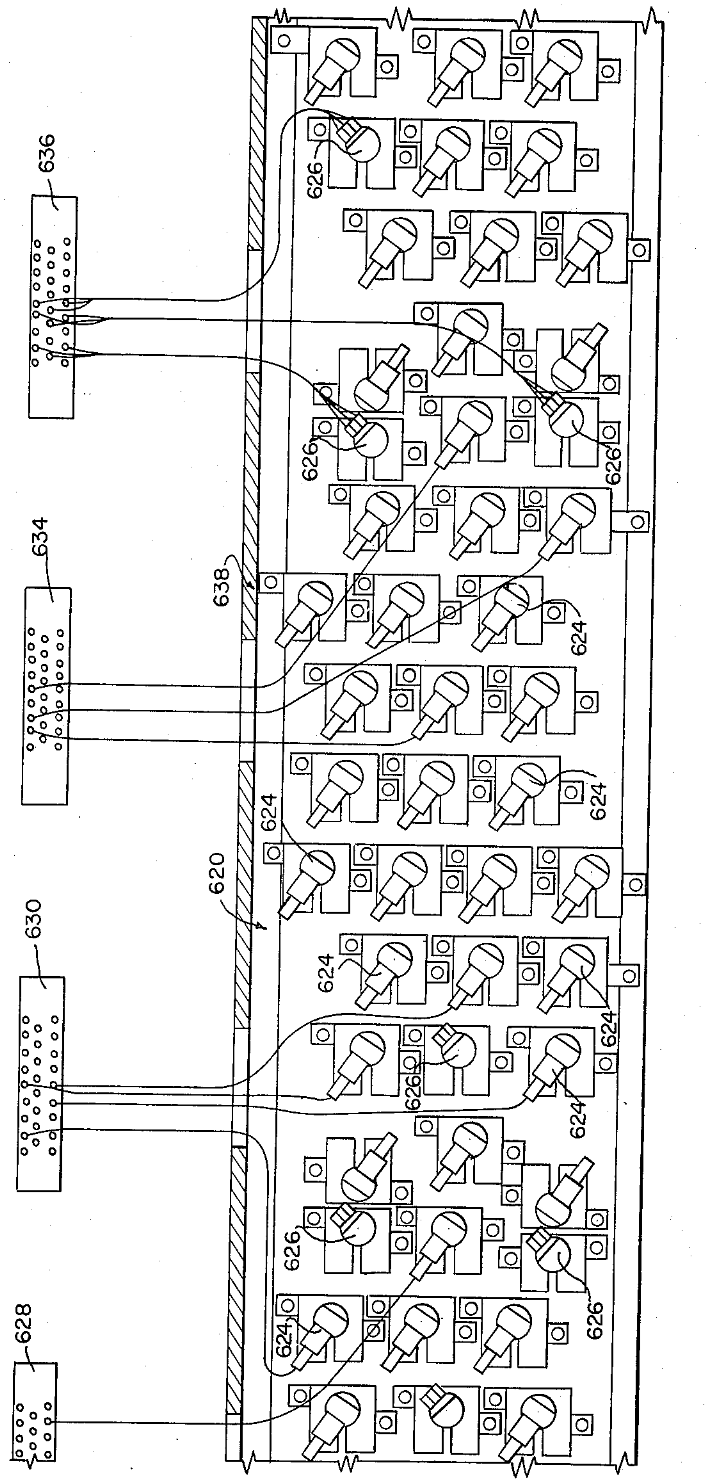
FIGURE 5 is a schematic developed view of the shroud of FIGURE 4, and this view also shows the heads mounted in the shroud and the different connections to the heads from corresponding terminal blocks.

The developed view of FIGURE 5 shows the shroud 620 and it illustrates the manner in which a plurality of electromagnetic transducer means are positioned in the various apertures in the shroud in magnetically-coupled relationship with the different channels, or tracks, on the magnetic drum.

As illustrated in FIGURE 5, a plurality of read heads 624 and a plurality of write heads 626 are supported on the shroud 620 in a manner to be described. The read heads and write heads, as mentioned previously, are supported by the shroud in magnetically coupled relationship with the periphery of the magnetic drum. The heads are supported in this manner to be disposed adjacent corresponding imaginary annular tracks on the drum, as noted in magnetically coupled relationship with those tracks. Magnetic recordings are made in known manner in the annular tracks to provide magnetic storage for the information used by the computer, as will be more fully described.

The leads from the different read and write heads are brought out to a plurality of connectors or terminal blocks 628, 630, 634 and 636. The leads extend to the connectors through an end shield 638 which is shown in FIGURES 1 and 2. As shown in FIGURE 2, the terminal blocks, such as the blocks 628 and 636 are supported on the shield 638; appropriate covers 640 being provided, as shown in FIGURE 1.

Figures 6, 7:
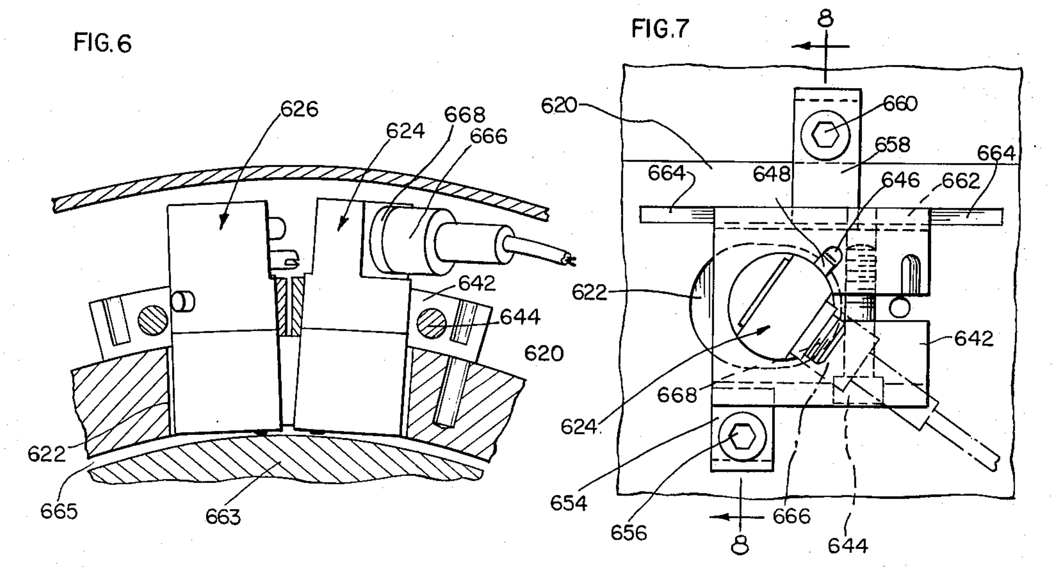
FIGURE 6 is an enlarged side elevational view, partly in section, showing a fragment of the shroud of FIGURE 4 and also showing the manner in which a read head is supported in the shroud.
FIGURE 7 is a top plan view of the read head of FIGURE 6 and also shows the manner in which the read head is supported in the shroud.
Figure 8:
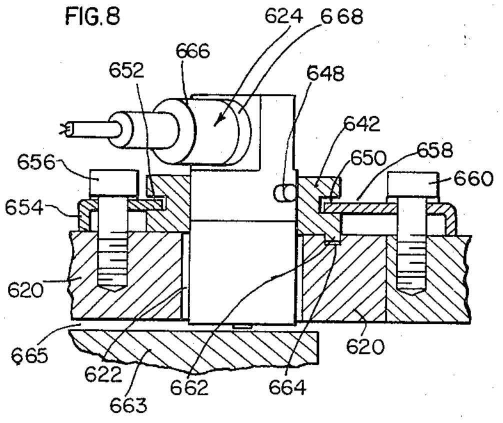
FIGURE 8 is a sectional view, substantially on the line 8—8 of FIGURE 7 and showing in further detail the mounting means which is used to support the read head on the shroud.

The manner in which a typical write head 626 and a typical read head 624 are supported in corresponding apertures 622 in the shroud 620 are shown in FIGURE 6. As illustrated in FIGURES 6, 7 and 8, the read head 624 is supported in a corresponding aperture 622 by means of a clamp 642. The clamp 642 is drawn tightly about the periphery of the read head 624 by means of a screw 644. It will be noted from FIGURE 7 that the clamp 642 includes a slot 646 which receives a locating pin 648, the pin extending radially out from the peripheral surface of the read head 624. The pin 648 in its engagement with the slot 646 serves to establish the read head at the proper orientation.

The clamp 642, as best shown in FIGURE 8, is slotted, as at 650 and 652. The slot 652 receives an L-shaped bracket 654, and a screw 656 extends through the bracket, the screw being threaded into the shroud 620. Likewise, an L-shaped bracket 658 extends into the slot 650, and a screw 660 extends through a hole in the bracket 658 and is threaded into the shroud 620.

The clamp 642 includes an integral collar 662 which extends into a groove 664 in the shroud 620 and which serves to position the head 624 accurately in the aperture 622. The clamp 642 is held with a particular orientation by means of the collar 662 and groove 664. Likewise, the head 624 is held with a particular orientation in the clamp 642 by means of the pin 648 and slot 646. Then, when the screws 660 and 656 are tightened down, the read head 624 is supported in the aperture 622 with a fixed orientation with respect to the shroud 620. Before the screw 644 is tightened, the head 624 may be moved up or down in the aperture 622 until the proper axial position of the head with respect to the drum is accomplished. Then, the screw 644 may be tightened rigidly to hold the head in that axial position. The head is held rigidly against any traverse motion in the apertures 622 and groove 664. However, some longitudinal adjustment is permitted, as the collar 662 may be moved along the groove 664 within certain limits and in an arcuate direction with respect to the drum.

The mounting structure described above permits the read heads to be mounted with a predetermined precisely located angular disposition, as is required. Moreover, the axial displacement of each head in its corresponding aperture is adjustable until the optimum displacement of the head from the drum is reached. In addition, arcuate adjustments may be made of the heads so that they can be made to occupy an adjustable position with respect to the corresponding track on the drum surface. However, any axial displacement with respect to that track is prevented so as to assure precise registration of each head with its corresponding track.

In FIGURES 6 and 7, a portion of the magnetic drum is represented as 663, and the read head 624 is illustrated as being in magnetically coupled relationship with the drum across an air gap 665.

Each of the read heads 624 includes a coaxial connection 666, which will be described in more detail subsequently. The view of FIGURE 6 illustrates the coaxial type connector 666 being threaded into a mating coaxial receptacle 668.

Figure 9:
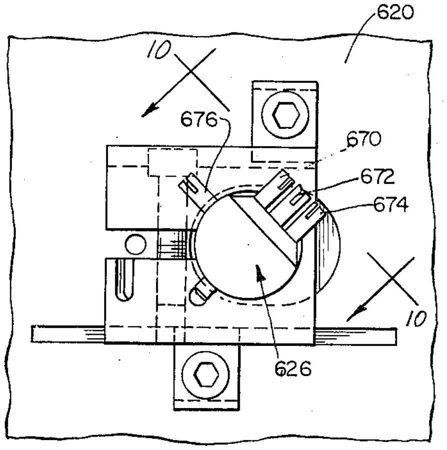
FIGURE 9 is an enlarged top plan view of a write head which is used in the computer to be described, together with a plurality of other similar write heads, this view showing the constructional details of the write head and the manner in which it is supported on the shroud.
Figure 10:
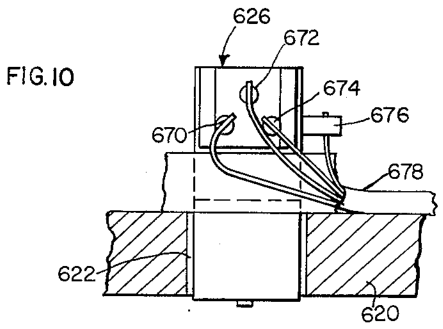
FIGURE 10 is a sectional view, substantially on the line 10—10 of FIGURE 9 and showing the manner in which the write head is supported in the shroud and how connecting leads are brought to the write head.

As illustrated in FIGURE 9, the connections to the write head 626 are made by means of a group of three terminal connectors 670, 672 and 674, rather than by means of a coaxial connector, as was the case with the read head. The write head 626 also includes an additional terminal 676 which is grounded, and which receives a lead which extends to a shield 678 (FIGURE 10). The shield 678 surrounds the leads which are connected to the terminals 670, 672 and 674. The mounting means by which each of the write heads 626 is mounted on the shroud 620, as shown in FIGURE 9, may be similar to the mounting means for the read heads 624. For that reason, a detailed description of the mounting means of the write head 626 will not be repeated.

Figure 11:
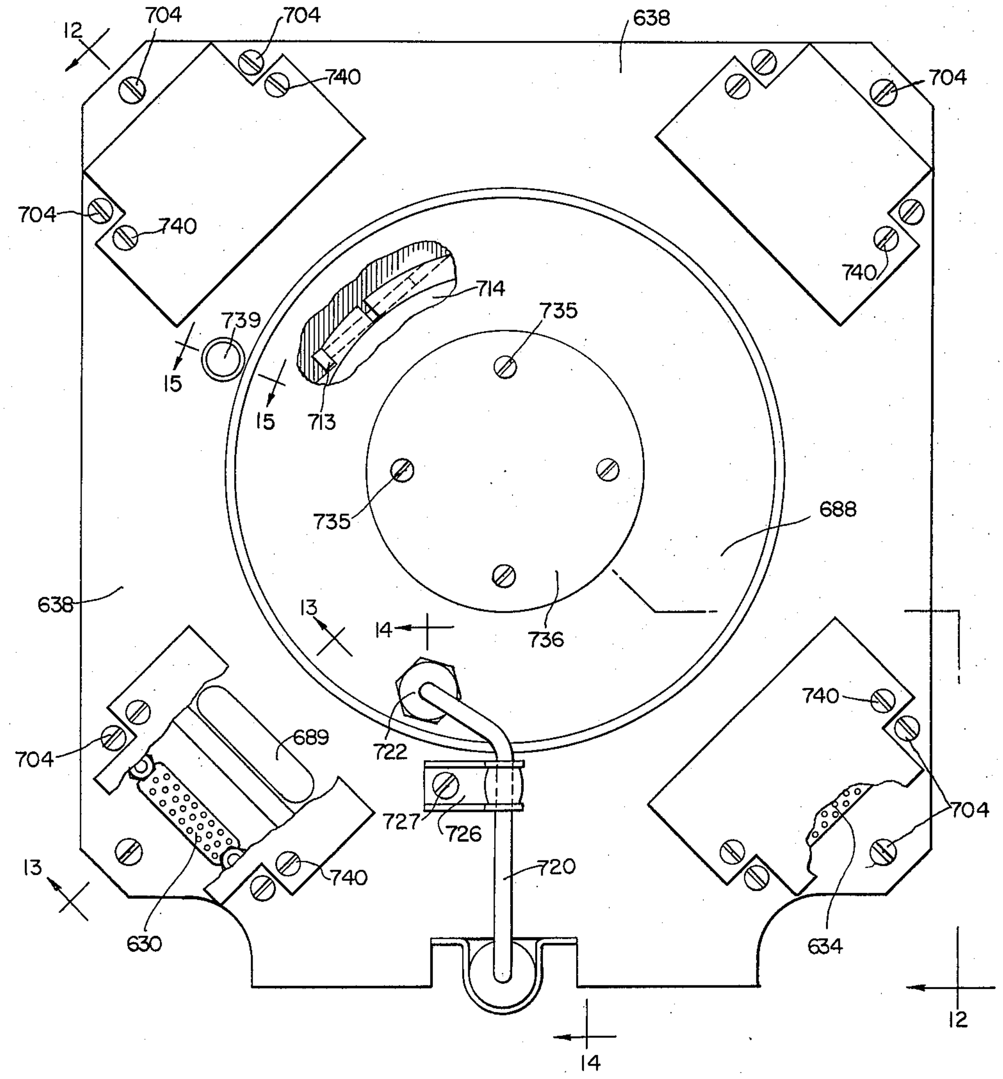
FIGURE 11 is an end view of the magnetic drum memory unit which is used in the embodiment of the invention to be described, this view illustrating particularly the manner in which certain electrical connections are made to the memory unit.

The details of the drum unit 610 are shown in more detail in FIGURES 11, 12, 13, 14 and 15. The end view of FIGURE 11 shows the shield 638 and other components of the memory drum unit, some of which have been previously described. Portions of the shield 638 have been broken away in the view of FIGURE 11 to reveal certain internal connections of the drum unit.

Figure 12:
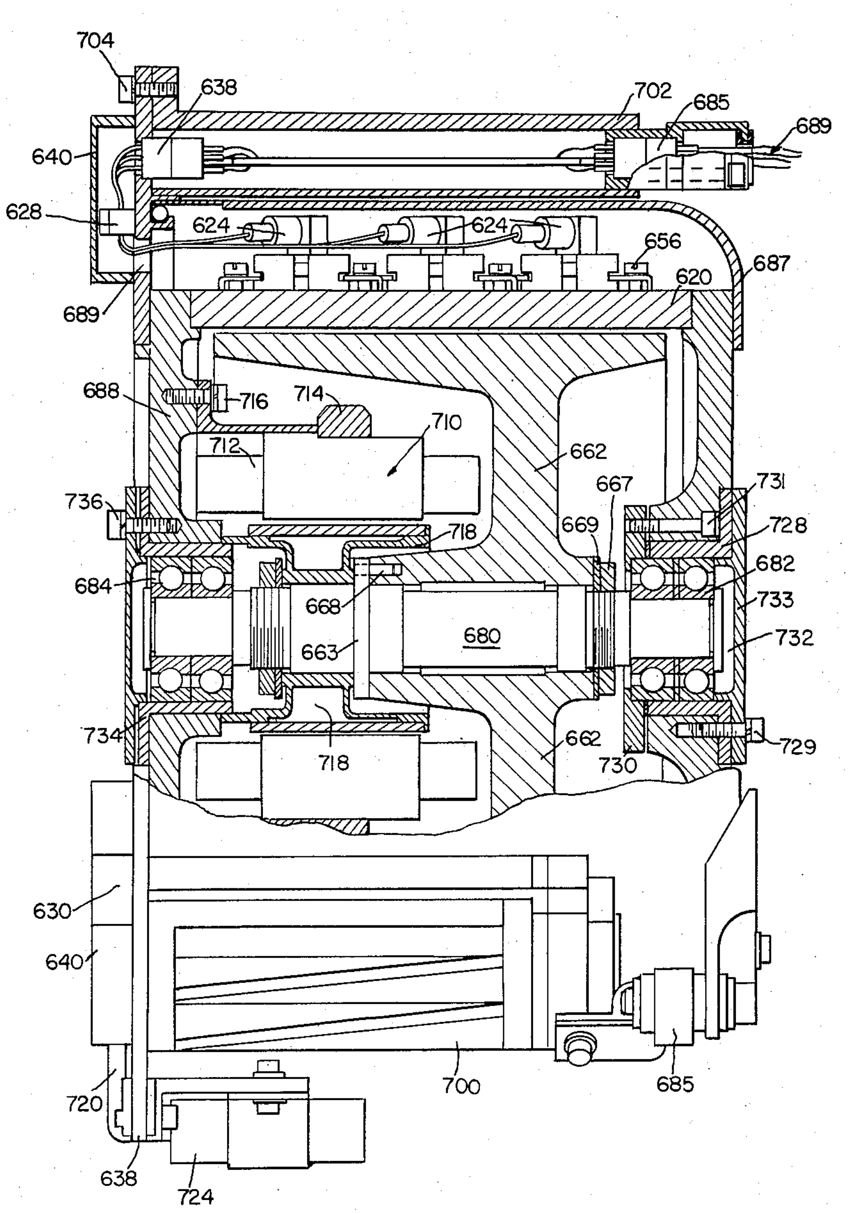
FIGURE 12 is a side elevational view, partly in section, and substantially on the line 12—12 of FIGURE 11 of the magnetic drum memory unit, and this view shows the different components which make up this unit.
Figure 13:
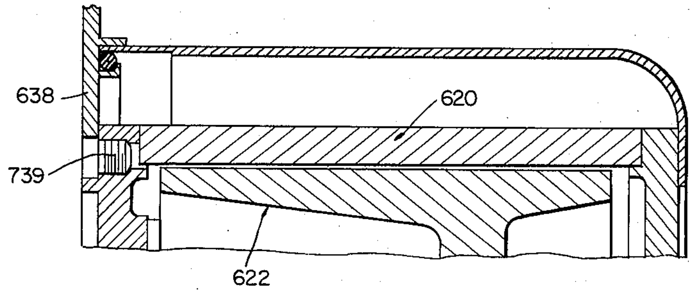
FIGURE 13 is a sectional view, substantially on the line 13—13 of FIGURE 11, of the memory unit.

As illustrated in the sectional view of FIGURE 12, the magnetic memory drum unit includes a shaft 680 which may be composed of steel, or any other appropriate material. The shaft 680 is rotatably supported in bearing assemblies 682 and 684 at its opposite ends. The bearing assemblies are supported by respective disk-like end members 686 and 688 which, in turn, are secured to the shroud 620 which has been described above. The shield 638 is mounted to the end member 688 (see FIGURE 13).

Figure 14:
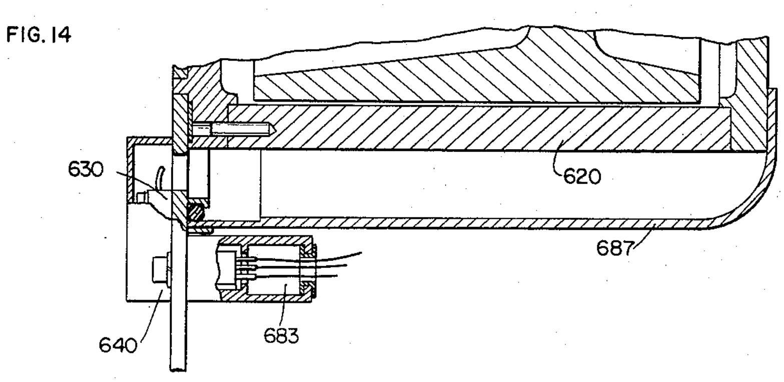
FIGURE 14 is a sectional view, substantially on the line 14—14 of FIGURE 11, of the memory unit and shows the manner in which electrical connections are made to one of a plurality of pre-amplifier boards which are supported in the memory unit.
Figure 15:
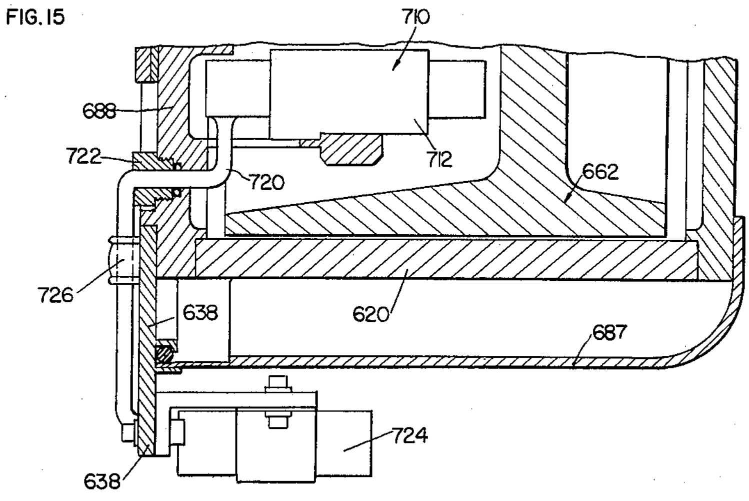
FIGURE 15 is a sectional view, substantially on the line 15—15 of FIGURE 11, of the memory unit, and this latter view illustrates particularly the manner in which a drive motor for the drum is mounted in the unit and how electrical connections are brought to the drive motor.

The read heads 624, illustrated in FIGURE 12, and the write heads 626, are mounted on the shroud 620 as mentioned above. These heads are surrounded by an appropriate cylindrical cover member 687. The leads from the read and write heads extend through apertures 689 in the shield 638, and these leads are connected to corresponding terminals of the terminal blocks, such as the blocks 630, 634, 636 and 628. These blocks, as mentioned above, are illustrated in FIGURE 5, and they are also illustrated in FIGURES 11 and 12. The connections to the block 628 are particularly shown in FIGURE 12, and those to the block 630 are shown in FIGURE 14.

Four separate panels, or boards, 700 are supported adjacent respective ones of the terminal blocks 628, 630, 634 and 636. Each of these boards supports circuitry and electrical components which are connected to function as pre-amplifiers. Connections are made from the terminal blocks through respective connectors 683 (FIGURES 12 and 14) to the pre-amplifier circuitry on the corresponding boards 700, and output connections from the boards are made through connectors, such as the connector 685. It will be appreciated that similar input and output connectors are associated with the other pre-amplifier boards 700. Output leads 689 extends from each of the connectors 685.

The disclosed arrangement enables the leads from the read heads 624 to be relatively short. This is most important, because leads carry signals of extremely low amplitude, and if the leads have any appreciable length the signals are lost in pick-up noise. The signals from the leads are then amplified by the pre-amplifiers on the boards 700 to an appreciable amplitude level, and they are carried to utilization circuitry within the computer by means of the leads 689.

Each of the pre-amplifier boards 700, as illustrated in FIGURE 12, for example, extend lengthwise from the shield 638 to the other end of the memory unit, and they are positioned at spaced angular locations about the shield 687. The boards 700 are supported within respective housings 702, these housings in turn being supported at one end on the shield 638 by means of screws, such as the screws 704. The housings 702 may be composed of suitable shielding material, such as aluminum. Likewise, the cover 687 may be composed of aluminum.

The drum 662 may also be composed of aluminum, or of an aluminum alloy, and its surface has a coating of any suitable magnetizable material formed on it. The drum is mounted on the shaft 680 by means of a shrink-fit so that the drum will remain rigidly affixed to the shaft 680 despite thermal expansions due to temperature changes. The drum is positioned against a shoulder 663 on the shaft 680, and it is secured to the shoulder by a plurality of screws, such as the screw 665. A retainer 667 is threaded to the shaft 680 at the other end of the hub portion of the drum 662, and this retainer serves to hold the drum securely against the shoulder 663. A washer 669 is interposed between the retainer 667 and the drum.

The shroud 620, as shown in FIGURE 12, surrounds the peripheral surface of the drum 662. The peripheral surface of the drum is treated with a suitable magnetic coating, as noted above, so that magnetic recordings may be made on that surface. The shroud 620, and the end plates 686 and 688, may also be composed of a suitable material such as aluminum, or an aluminum alloy. The peripheral surface of the drum 662 is positioned to be as close to the inner surface of the shroud 620 as possible, so that the gap between these members may be reduced to a minimum. This causes the temperature differential between the drum and the shroud to be extremely small, and this in turn causes the two members to expand and contact substantially to the same extent when thermal expansion takes place.

Rotational motion is imparted to the drum 662 by means of an electric motor 710. The stator of the motor 710 is supported in an annular bracket 714 which, in turn, is mounted on the end member 688 by means of a plurality of screws such as the screw 716. The annular bracket 714 is clamped over the stator 712 by means of a screw 713 (FIGURE 11) which is threaded into the annular bracket across a split portion of the bracket. The rotor 718 of the motor is mounted directly on the shaft 680.

The motor 710 is energized by means of a cable 720 which extends through a bushing 722 in the end member 688 (see especially FIGURE 14). The cable extends to the winding portion of the stator 712 from an appropriate coaxial connector 724, the cable being held in place on the shield 628 by means of a clip 726. The clip 726 is fastened to the shield 638 by means of a screw 727 (FIGURE 11).

As particularly illustrated in FIGURE 12, the bearing assembly 682 is actually a duplex pre-loaded bearing pair. The outer races of the bearings are captured in a central aperture in the end member 686 by means of a bushing. The bushing is held in place by means of a plurality of screws, such as the screw 729. An inner retainer 730 holds the bearing assembly 682 against axial movement, and this ring is held against the end member 686 by means of a plurality of screws, such as the screw 731. A cap is held against the right hand end of the bearing 682 by an external cover 733. The cover 733 is held in place against the end member 686 by these screws 729. The inner races of the pre-loaded bearing assembly are rigidly fitted to the shaft 680, and the bearings are held by the components described immediately above so that no radial or axial motion of the right hand end of the shaft 680 is permitted.

The bearing assembly 684 is also a duplex type which incorporates a bearing pair. The latter bearing assembly is supported in a central aperture in the end member 688 in a bushing 734. The bushing 734 is held in place by a plurality of screws, such as the screw 735. The screws 735 also extend through a cover 736 which holds a cap 737 against the left hand end of the bearing 684 in FIGURE 12. The bearing assembly 684 is free to move axially in its bushing 734 under thermal expansion of the shaft 680. The described mounting arrangement for the bearing assemblies 682 and 684 renders the shaft 680 relatively immune to shock and vibration, yet it permits the shaft to expand and contract due to temperature variations without binding.

A plug 739 (see also FIGURE 13) is provided in a corresponding aperture in the shield 638 and end member 688. This plug may be removed to permit visual inspection of the clearance of the surface of the drum 662 with the inner surface of the shroud 620.

The motor 710 may be of the alternating current synchronous hysteresis type. As noted previously, the stator 712 of this motor is rigidly supported in the annular bracket 714 to surround the shaft 680, and the hysteresis rotor 718 of the motor is directly mounted on the shaft 680 of the memory drum. In this manner, the motor is made as an integral part of the drum structure. The hysteresis rotor of the motor is positioned on the shaft 680 of the memory drum in nested concentric relationship with the stator 712. When the motor is energized, the rotor and the shaft are caused to rotate at synchronous speed in accordance with known hysteresis motor principles.

The structural details of one of the write heads 626, as noted previously, are shown in FIGURES 16, 17, 18 and 19. The write head 626 includes a gapped magnetic core 750 which is composed, for example, of ferrite. The core 750 has the illustrated configuration, and it includes a pair of legs 752 and 754 which are disposed essentially at 90 degrees to one another. The core also includes an interconnecting arcuate segment 756 which is integral with the legs 752 and 754. To illustrate the extremely small size of the read and write heads of the embodiment of the invention illustrated herein, it might be pointed out that in a constructed embodiment of the invention, the leg 752 has a length of the order of .30 inch, the leg 754 has a length of the order of .35 inch, and the core itself has a width of the order of .05 inch.

A gap 758 is formed between the extremities of the legs 752 and 754, and the gap may have a width of the order of .01 inch. A shim composed, for example, of silver may be inserted in the gap 758, and the shim may be cemented in place. The arcuate segment 756 may be coated with an appropriate insulating enamel. A bi-filar winding 760 is then formed on the arcuate segment 756. Two of the leads of the bi-filar winding are joined together to form a center tap for the winding, and these joined leads are connected to the terminal 672. The other leads of the windings are connected respectively to the terminals 670 and 674. An annular end plate 762 is fitted over the core 750, and the end plate includes an integral peripheral flange 764.

Figure 16:
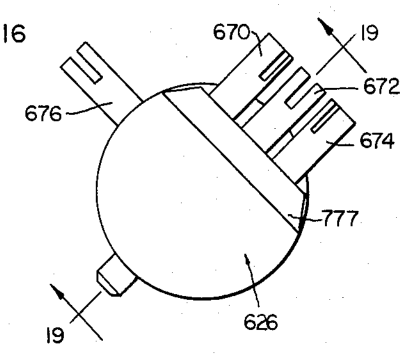
FIGURE 16 is a top plan view of one of the write heads which is used in the embodiment of the invention to be described.
Figure 19:
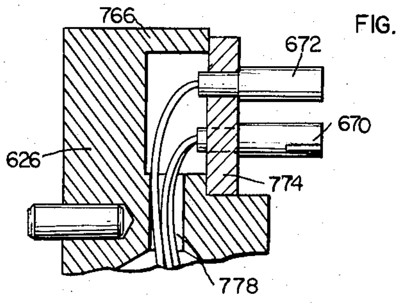
FIGURE 19 is a fragmentary sectional view of the write head, taken substantially on the line 19—19 of FIGURE 16 and showing how certain terminals of the head are supported.

The write head 626 includes a housing 766 which, in turn, includes a plurality of integral fingers 768 which extend longitudinally from the upper portion of the housing in FIGURE 16 to surround the core 750 and engage at their lower extremities the end plate 762. A shield 770 composed, for example, of a silver strip, or of a pair of strips of mu metal and silver, is wrapped around the fingers 768 of the housing 766. The shield may be wrapped in several convolutions about the fingers and soldered in place. A lead 772 is soldered to the shield 770 and this lead is connected to the terminal 676, as more clearly shown in FIGURE 18.

The terminal 676 is directly supported on the housing 766 and connected to the housing. A suitable ground connection the housing and to the shield 770 may then be made by way of the terminal 676. The terminals 670, 672 and 674 on the other hand, are supported on an insulating strip 774. The strip 774 is fastened to the housing 766 over a space 776 in the upper portion of the housing. The leads from the winding 760 extend through a channel 778 in the housing to the space 776 for connection to the terminals 670, 672 and 674.

The diameter of the housing 766 may be of the order of .406 inch, for example, and its over-all length may be of the order of .845 inch. The fingers 768 may have a length of .365 inch. The shield 770, if so desired, may have alternate turns of mu metal (as mentioned above) for improved magnetic shielding.

Figure 20:
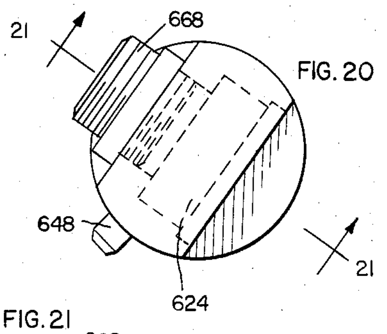
FIGURE 20 is a top plan view of one of the read heads which are used in the embodiment of the invention to be described.
Figure 21:
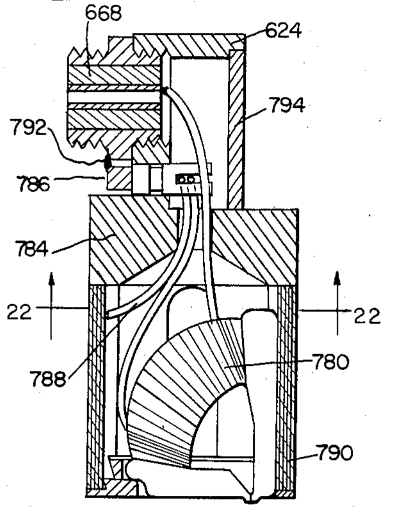
FIGURE 21 is a sectional view of the read head, substantially on the line 21—21 of FIGURE 20; this latter view showing the magnetic core structure of the read head and how the electric winding of the lead is supported on the core structure.
Figure 18:
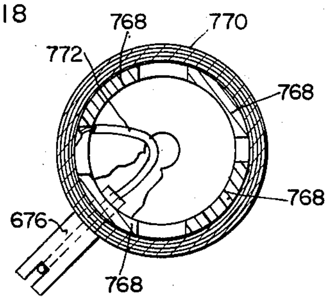
FIGURE 18 is a cross-sectional view of the write head, taken substantially on the line 18—18 of FIGURE 17.
Figure 22:
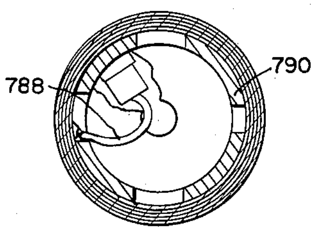
FIGURE 22 is a cross-sectional view of the read head taken along the line 22—22 of FIGURE 21.

The details of one of the read heads 624 are shown in FIGURES 20, 21 and 22. The construction of the head is generally similar to that of the write head described above, and the read head may have essentially the same dimensions. However, the read head winding 780 has but two leads, one of which is brought through a channel 782 in its housing 784 to the center terminal of the coaxial connector 668. The lead from the read head winding 780 is brought through the channel 782 and soldered to a terminal 786. The lead 788 from the shield 790 is also brought through the channel 782 and soldered to the terminal 786. The terminal 786 is connected to the housing 784 and is soldered to the outer shell of the coaxial connector 668 by a solder connection 792.

Figure 17:
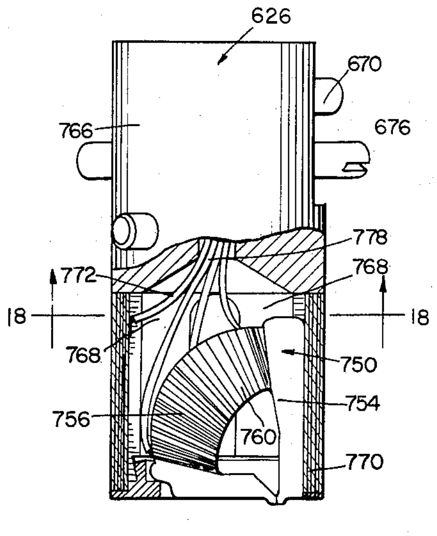
FIGURE 17 is a side view, partly in section, of the write head of FIGURE 16, the latter view showing the configuration of the core structure of the head and how the energizing coil is supported on that structure.

The housing 784 of the read head is provided with an opening 794 which permits the leads from the winding 780 and the lead 788 to be connected to their respective terminals. After such connections have been made, a cover may be fitted over the opening and cemented in The outer diameter of the wrapped shield 770 and of the wrapped shield 790 of FIGURES 17 and 21 is made less than the outer diameters of the upper portions of the respective housings 766 and 784. Then the clamps, such as the clamp 642 of FIGURE 18 engages only the solid upper portion of the corresponding housing and no clamping force is exerted on the fingers or on the core in the corresponding heads. This permits the clamps to be securely tightened on the heads without fear of damage.

It will also be noted that the core 750 of the write head of FIGURE 17, and the corresponding core of the read head of FIGURE 21, are clamped by the annular end plate 762 only in the plane of the air gap. This permits the remainder of the core to move as thermal expansion and contraction takes place with temperature changes. This takes care of differential expansions of the core with respect to the housing 766, and such expansions do not affect the width of the air gap.

The construction of the read and write heads described above is advantageous in that, in addition to other features, it permits these heads to be relatively small in size and to be placed closely adjacent one another without creating electric or magnetic interference. This, in turn, enables a large number of the read and write heads to be mounted on the shroud 620 for interaction with a large number of tracks on the magnetic memory drum 662, and this is achieved with extremely small drum and shroud diameters. These factors contribute to a large extent in maintaining the over-all dimensions of the computer at a minimum.

The transducer head of FIGURES 23–26 is designated 800. As mentioned previously, this head can be constructed in the manner described above to function as a read head or in the above described manner to function as a write head.

Figures 23, 24:
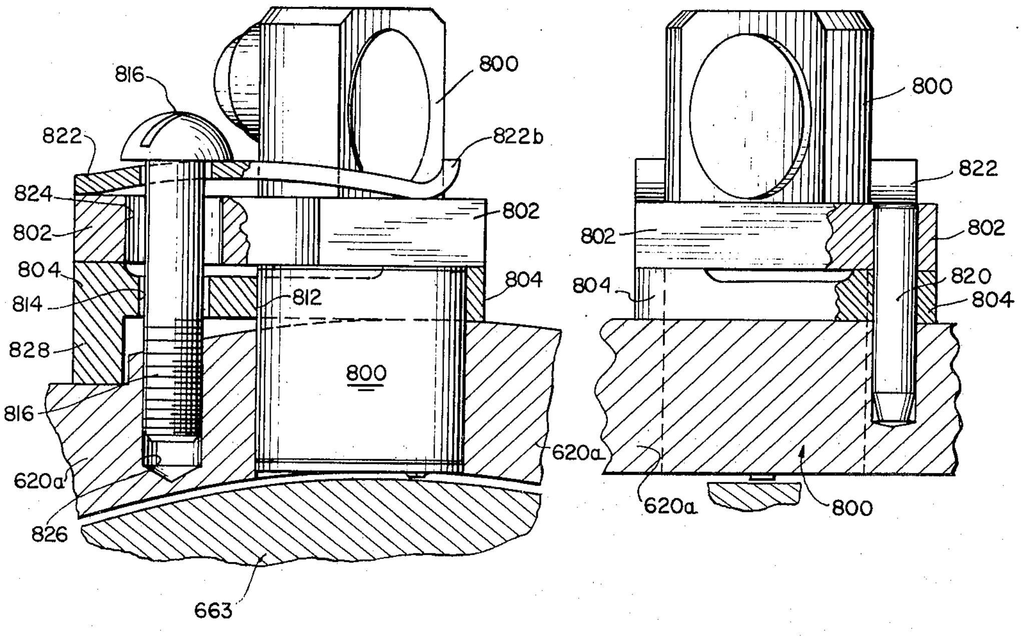
FIGURE 23 is an enlarged side view, partly in section, of a write or read head constructed in accordance with a further embodiment of the invention.
FIGURE 24 is an enlarged side view partly in section of the further embodiment of the invention, like the view of FIGURE 23 but turned through ninety degrees to reveal a locating pin which is included in the assembly.

The transducer head 800 is fitted into an aperture in the shroud, which shroud is designated 620*a* in FIGURES 23 and 24, so that its lower end may be brought into magnetically coupled relationship with the periphery of the magnetic memory drum 663. It will be understood that a plurality of similar read and write heads may be so positioned in the shroud 620*a*.

The transducer head is provided with an integral flange 802 which is larger in diameter than the diameter of the aperture in the shroud 620*a* into which the head is fitted. This flange serves as a positive assurance that the head will not move down in the aperture to a position in which its lower end will contact and damage the periphery of the drum.

An adapter member 804 is positioned between the flange 802 and the surface of the shroud 620*a*. This adapter serves as a shim, precisely to locate the radial position of the head 800 with respect to the periphery of the drum 663, so as to provide the desired spacing between the head and the drum. The adapter 804 may be selected from a plurality of such adapters of different thicknesses so as to provide exactly the desired spacing.

Figures 25, 26:
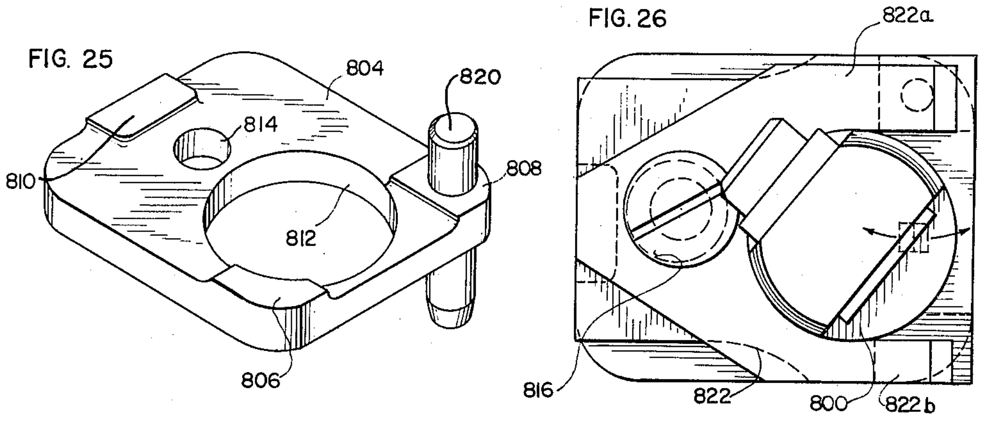
FIGURE 25 is an enlarged perspective view of a shim, together with the locating pin referred to above, the shim being used to establish the radial position of the head of FIGURES 24 and 25 with respect to the periphery of the memory drum.
FIGURE 26 is a top plan view on an enlarged scale of the further embodiment of the head of FIGURES 23 and 24.

The adapter 804, as shown in FIGURE 25 is provided with three raised portions on its upper surface; designated 806, 808 and 810. These raised portions receive the flange 802 and engage the lower surface of the flange. The adapter also includes a large aperture 812 for receiving the body portion of the head 800, and it includes a small aperture 814 for receiving a mounting screw 816 (FIGURE 23).

An aperture extends through the adapter 804 in the vicinity of its raised portion 808, and an aligned aperture extends through the flange 802. These apertures receive a locating pin 820 which extends through these apertures and down into a locating hole in the shroud 620*a*. This locating pin arrangement permits the head assembly to be pivotted slightly about the pin before the assembly is tightened into place. This provides a measure of circumferential adjustment of the lower end of the head 800 with respect to the magnetic memory drum.

A bowed retaining spring member is fitted over the flange 802. This spring member is bifurcated to provide a pair of legs 822*a* and 822*b* which extend on opposite sides of the head 800. The spring retaining member 822 is shaped so that it engages the top surface of the flange 802 at three points corresponding respectively to the raised portions 806, 808 and 810 of the adapter 804. This prevents the imposition of any binding stresses on the flange 802 as the screw 816 is tightened into place.

The retaining member 822 extends across the top of the pin 820 to hold the pin in place, and it has an aperture in it which is aligned with the aperture 814 in the adapter 804. The screw 816 extends through this aperture in the retaining member, through an aligned aperture 824 in the flange 802, and through the aperture 814, into threaded engagement with a threaded aperture 826 in the shroud 620*a*.

The adapter 804 has a downwardly depending portion 828 (FIGURE 23) which extends into mating engagement with a corresponding channel in the shroud 620*a* for locating purposes. When the screw 816 is tightened down into the threaded aperture 826 in the shroud, the retaining member 822 is flattened out against its spring tension and serves to firmly hold the assembly on the shroud, with the portion 828 of the adapter 804 extending into its corresponding channel or slot in the shroud, and with the locating pin 820 being held in its hole in the shroud.

The head 800 is now firmly held in position on the shroud 620*a*, with its lower end accurately located with respect to the periphery of the drum 663 and precisely spaced from that periphery. Moreover, the head assembly is constructed to assure that the head is so held in spaced relationship with the periphery of the drum, and to preclude any tendency for the head assembly to slip down in its aperture in the shroud and contact the drum.

I claim:

1. An electro-magnetic transducer head assembly adapted to be mounted in an aperture in a supporting member, the supporting member further having a locating hole and a locating channel formed therein, said assembly including: a transducer head including a body portion adapted to be inserted in the aperture in the supporting member and having a peripheral flange portion located at an intermediate position on the body portion and extending radially outwardly from said body portion, an essentially flat plate-shaped adapter member interposed between the flange and the surface of the supporting member and including an upper surface having a plurality of raised portions formed thereon for engaging the lower surface of the flange and including a lower surface having a depending portion formed thereon and adapted to extend into the locating channel in the supporting member, a locating pin adapted to extend through the flange and through the adapter member and into the locating hole in the supporting member, a bowed strip-like resilient retaining member positioned on the top surface of said flange and shaped to engage the flange at points in respective alignment with the raised portions of the adapter and to engage the top of the locating pin, and screw means extending through said resilient retaining member and through said flange and through said adapter member into threaded engagement with the supporting member to hold the assembly in place on the supporting member.

2. An electro-magnetic transducer head assembly including: a supporting member having an aperture therein and further having a locating hole and a locating channel, a transducer head including a tubular body portion inserted in the aperture in the supporting member and having an integral peripheral flange portion located at an intermediate position on the body portion and extending radially outwardly from said body portion, an adapter essentially flat plate-shaped member positioned between the flange and the surface of the supporting member and including an upper surface having a plurality of raised portions formed thereon engaging the lower surface of the flange and including a lower surface having a depending portion formed thereon and extending into the locating channel in the supporting member, a locating pin extending through the flange and through the adapter member into the locating hole in the supporting member, a strip-like bowed retaining member positioned on the top surface of said flange and shaped to engage the flange at points in respective alignment with the raised portions of the adapter and to engage the top of the locating pin, and a mounting screw extending through the resilient retaining member and through said flange and through said adapter into threaded engagement with the supporting member to hold the assembly in place on the supporting member.

3. An electro-magnetic transducer head assembly adapted to be mounted in an aperture in a supporting member, the supporting member further having a locating hole formed therein, said assembly including: a transducer head including a body portion adapted to be inserted in the aperture in the supporting member and having a peripheral flange portion located at an intermediate position on the body portion and extending radially outwardly from said body portion, an essentially flat plate-shaped adapter member interposed between the flange and the surface of the supporting member having an upper surface engaging the lower surface of the flange and having a lower surface; a bowed strip-like resilient retainer member positioned on the top surface of said flange and shaped to engage said flange, a locating pin extending through the flange and through the adapter member into the locating hole in the supporting member, and screw means extending through said resilient retainer member and through said flange and through said adapter member into threaded engagement with the supporting member to hold the assembly in place on the supporting member.

(References on following page)

References Cited by the Examiner

UNITED STATES PATENTS

| | | | |
|---|---|---|---|
| 2,862,067 | 11/1958 | Christoff | 340—174.1 |
| 2,863,134 | 12/1958 | Buchholz et al. | 340—174.1 |
| 2,864,892 | 12/1958 | Perkins | 340—174.1 |
| 2,900,625 | 8/1959 | Jones et al. | 340—174.1 |
| 2,905,521 | 9/1959 | Hollabaugh | 340—174.1 |
| 2,905,933 | 9/1959 | Canepa | 340—174.1 |
| 2,907,007 | 9/1959 | Baker et al. | 340—174.1 |
| 2,910,544 | 10/1959 | McNutt | 340—174.1 |
| 2,916,726 | 12/1959 | Mansky | 340—174.1 |
| 2,931,691 | 4/1960 | Curtis et al. | 340—174.1 |
| 2,945,216 | 7/1960 | Gyger et al. | 340—174.1 |
| 3,001,181 | 9/1961 | Taft | 340—174.1 |

IRVING L. SRAGOW, *Primary Examiner.*

EVERETT R. REYNOLDS, *Examiner.*